US010766716B2

(12) United States Patent
Ullrich et al.

(10) Patent No.: US 10,766,716 B2
(45) Date of Patent: Sep. 8, 2020

(54) CONTAINER-HANDLING DEVICE WITH CENTERING ELEMENTS FOR CLAMPING CONTAINERS

(71) Applicant: KHS GmbH, Dortmund (DE)

(72) Inventors: Andreas Ullrich, Solingen (DE); Klaus-Friedrich Stock, Dortmund (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/489,975

(22) PCT Filed: Feb. 6, 2018

(86) PCT No.: PCT/EP2018/052846
§ 371 (c)(1),
(2) Date: Aug. 29, 2019

(87) PCT Pub. No.: WO2018/166714
PCT Pub. Date: Sep. 20, 2018

(65) Prior Publication Data
US 2020/0010285 A1  Jan. 9, 2020

(30) Foreign Application Priority Data
Mar. 15, 2017 (DE) .......... 10 2017 105 482

(51) Int. Cl.
B65G 47/86 (2006.01)
B65C 9/02 (2006.01)
(Continued)

(52) U.S. Cl.
CPC .......... B65G 47/847 (2013.01); B65C 9/02 (2013.01); B65C 9/06 (2013.01); B67C 3/242 (2013.01);
(Continued)

(58) Field of Classification Search
None
See application file for complete search history.

(56) References Cited

U.S. PATENT DOCUMENTS 5,137,136 A * 8/1992 Humele ............. B65C 9/065
156/567
7,621,738 B2 * 11/2009 Doudement ........ B29C 49/4205
198/341.05
(Continued)

FOREIGN PATENT DOCUMENTS

DE  11 60 749    1/1964
DE  31 12 341    10/1982
(Continued)

Primary Examiner — William R Harp
(74) Attorney, Agent, or Firm — Occhiuti & Rohlicek LLP

(57) ABSTRACT

A container-handling device includes two rotors, holders that are arranged around a periphery of the first rotor and receptacles around the first rotor such that as it rotates, the receptacles pass through distinct angular ranges. When a receptacle has a container, relative movement therebetween causes its centering element and its counter-bearing to clamp a container between them with the holder engaging the container above the counter-bearing A first partial-stroke occurs while the receptacle is in a first angular region and a second partial-stroke occurs after the receptacle has left the first angular region. During the first partial-stroke, the centering element bears against a container's mouth with a pressure, and, during the second partial-stroke, this pressure increases.

19 Claims, 2 Drawing Sheets

(51) Int. Cl.
    *B65C 9/06*         (2006.01)
    *B67C 3/24*         (2006.01)
    *B65C 3/26*         (2006.01)

(52) U.S. Cl.
    CPC ........ *B65C 3/26* (2013.01); *B65G 2201/0244* (2013.01); *B65G 2811/0626* (2013.01)

(56) References Cited

U.S. PATENT DOCUMENTS

| | | |
|---|---|---|
| 7,849,996 B2 | 12/2010 | Leblond et al. |
| 8,935,903 B2 * | 1/2015 | Leykamm ............. B65B 21/245 |
| | | 53/111 R |
| 9,878,482 B2 * | 1/2018 | Zoppas ............... B29C 49/4205 |
| 2014/0166436 A1 | 6/2014 | Blochmann |
| 2017/0297758 A1 * | 10/2017 | Stenner .................. B67C 3/242 |

FOREIGN PATENT DOCUMENTS

| | | | |
|---|---|---|---|
| DE | 35 26 237 | 2/1987 | |
| DE | 91 13 832 | 1/1992 | |
| DE | 10 2013 213 846 | 1/2015 | |
| EP | 1 072 511 | 1/2001 | |
| EP | 2 604 571 | 6/2013 | |
| JP | 2012 103114 | 5/2012 | |
| WO | WO-2017097459 A1 * | 6/2017 | ............. B65C 9/045 |

* cited by examiner

CONTAINER-HANDLING DEVICE WITH CENTERING ELEMENTS FOR CLAMPING CONTAINERS

RELATED APPLICATIONS

This application is the national stage of international application PCT/EP2018/052846, filed on Feb. 6, 2018, which claim the benefit of the filing date of German application 10 2017 105 482.0, the contents of which are herein incorporated by reference.

FIELD OF INVENTION

The invention relates to a device for handling containers and a method for transferring and fixing containers in such a device.

BACKGROUND

It is known to have container-handling machines with multiple rotors in which a handover occurs from one rotor to the next. During a handover, a container being carried on one rotor transitions into being carried by another rotor.

A disadvantage of known container-handling systems arises when the container flow has an empty space. During a transfer between two rotors, it is likely that there will be a collision between a holder in one rotor and a container receptacle in another rotor.

SUMMARY

An object of the invention is therefore to provide a container-handling system that avoids such collisions. This promotes reliability and reduces wear.

In one aspect, the invention features a container-handling device comprising first and second rotors. Container holders that are arranged around a periphery of the second rotor hold containers that are being transported by the second rotor. The first rotor has container receptacles around its periphery such that, as the first rotor rotates, each of the receptacles passes through first, second, third, and fourth angular ranges. The holders and the receptacles interact with each other by meshing while both are within the first angular range. As a result of the interaction, the container is transferred between the first and second rotors.

Each receptacle comprises a movement mechanism, a centering element and a counter-bearing that interacts with the centering element. When a receptacle has a container, relative movement between the centering element and the counter-bearing causes them to cooperate in clamping the container between them at the container's mouth with the holder engaging the container above a region at which the counter-bearing engages the container.

The movement mechanism causes the relative movement between the centering element and the counter-bearing element. As a result, the receptacle executes a first partial-stroke and a second partial-stroke, The first partial-stroke occurs while the receptacle is in a first angular region and the second partial-stroke occurs after the receptacle has left the first angular region. During the first partial-stroke, the centering element bears against a container's mouth with a first pressure. Suring the second partial-stroke, the centering element bears against the mouth a second pressure, the second pressure being in excess of the first pressure.

The invention is based on the surprising recognition that the container can still also be taken from the holder even if the container is not fully clamped. This permits the use of two partial strokes of differing clamping pressures.

Among the advantages of the container-handling device is that clamping the container in a first partial stroke followed by a second partial stroke avoids collisions between the holders in one rotor and the centering elements on the other rotor. The extent of the first partial stroke is preferably selected so that the centering element still fixes the container with enough force to release it from the holder during the container's handover.

In some cases, there exists a hole in the container flow. As a result, there will be no container present in one or more holders. To accommodate this difficulty, some embodiments the first partial stroke is selected in such a way that the centering element remains above the holder during the first partial stroke. This is achieved by causing the centering element to move only a limited extent in the direction of the counter-bearing. As a result, if the holder happens to not have a container to offer, the centering element moves past the holder without touching it. Such a collision could easily occur because when the holder is in the transfer region, it projects into an intermediate space between the centering element and the counter-bearing.

A particularly simple way to control the partial strokes is to use a control curve to control the movement mechanism. This control curve causes the centering element to move by discrete amounts, each of which defines a level.

An alternative way to control the partial strokes is to use individual actuators, pneumatic cylinders, or motors, and in particular, linear motors.

In some embodiments, the movement mechanism interacts with a multi-step control curve that comprises at least one first and second levels. In the first level, the centering element is spaced at a distance from the container's mouth. In the second level, the centering element presses against the container's mouth. The intermediate level lies between the first and second levels. The resulting multi-step control curve thus implements a multi-step stroke with one partial stroke per level.

In some embodiments, the intermediate level causes a first partial stroke in which the centering element bears against the container's mouth region with a first pressure that results in a clamping force that is less than the full clamping force. This takes place within the first angular region. As a result, while the receptacle traverses the first angular region, the container is only loosely clamped. In those cases where the container flow is missing a container, this results in the centering element moving past the holder without hitting the holder. This reduces noise and vibration while also reducing wear.

Some embodiments feature a height-adjustable control curve in which the entire control curve can be moved up or down as a whole and as one unit. However, other embodiments have control curves with distinct segments, one or more of which can be moved vertically relative to other segments. Yet other embodiments feature a control curve with exchangeable segments. These embodiments provide ways to accommodate different container formats or different vertical positions of the holders.

Other embodiments feature exchangeable centering elements. These embodiments render the height-adjustable control curve superfluous. In those cases in which the container is tall, the centering element would have a correspondingly shorter vertical extent. Similarly, for a short container, one would use a correspondingly taller centering element. Among the embodiments with exchangeable centering elements are those in which the centering element can be exchanged without the need to use tools.

Embodiments include those in which the control curve has several intermediate levels, each of which is used for a corresponding angle range. Each of these angle ranges corresponds to a transfer region at which the rotor receives or discharges a container. In some embodiments, the intermediate levels are at angular ranges either immediately before or after other angular ranges in which the centering element is spaced at its maximum distance from the counter-bearing.

In some embodiments, the intermediate level is associated with either an inlet or an outlet region. In such embodiments, the first partial-stroke occurs while the receptacle is in the inlet region and again while the receptacle is in the outlet region. This means that if there is a hole in the container flow, the centering element moves past the holder and avoids contact with it regardless of whether the receptacle is receiving a container or discharging a container.

In some embodiments, the counter-bearing forms a support bearing for an outer container that exists at the container's neck. An example of such a contour is a neck ring.

The centering element has a shape that promotes aligning the container with the center-line of the receptacle. A variety of shapes can be used for the centering element. In some, the centering element is a truncated cone.

Other embodiments feature a plunger that moves the centering element. Among these are embodiments in which the plunger couples to a control curve so that the centering element moves up and down as the rotor rotates.

Some embodiments include a spring that can be compressed when the centering element presses against the container's mouth. Suitable materials for a spring include elastomers. A suitable type of spring is a pressure spring, such as a helical spring.

In these embodiments, the spring makes it possible to apply two different forces when clamping the bottle. In particular, it is possible for the centering element to first press loosely and to then press with greater force.

A variety of ways exist to implement the holders. In some embodiments, the holder takes the form of a pair of tongs. Such tongs hold a container passively at its mouth region. In other embodiments, the tongs take the form of grippers that must be actuated.

In some embodiments, the holder fixes the container in a region between the container's mouth and an outer contour of the container, one example of which is a neck ring. In such embodiments, the counter-bearing supports the outer contour. The holders' movement path intersects with the receptacles' movement path. If an empty space exists in the container flow, the centering element maintains a space from the holder so that even as the paths intersect, there is no collision or contact between the centering element and the holder.

In a further aspect, the invention features a method for using the container-handling device as described above.

Such a method includes causing the causing the holders and the receptacles to interact with each other by meshing while both are within the first angular range. This results in transferring the container between the first and second rotors such that the receptacle receives the container. The method also includes, while the receptacle is in the first angular region, executing a first partial stroke that causes the centering element to bear against the container's mouth with a first pressure and then, after the receptacle has left the first angular region, executing a second partial stroke that causes the centering element to bear against the container's mouth with a second pressure in excess of the first pressure.

Some embodiments feature exchangeable centering elements. These include embodiments in which the centering elements can be exchanged without the need for tools.

As used herein, "container-handling device" refers to devices that carry out a container-handling process. These include labeling machines and printers.

The expressions such as "essentially" and "approximately" indicate deviations from an exact value of ±10% and preferably ±5% and/or deviations in the form of alterations that are not of significance for function.

Further embodiments, advantages, and possible applications of the invention can also be derived from the following description of exemplary embodiments and from the figures. The contents of the claims are also considered to form a constituent part of the description.

BRIEF DESCRIPTION OF THE DRAWINGS

These and other features of the invention will be apparent from the following detailed description and the accompanying figures, in which.

DETAILED DESCRIPTION

Figure 1:
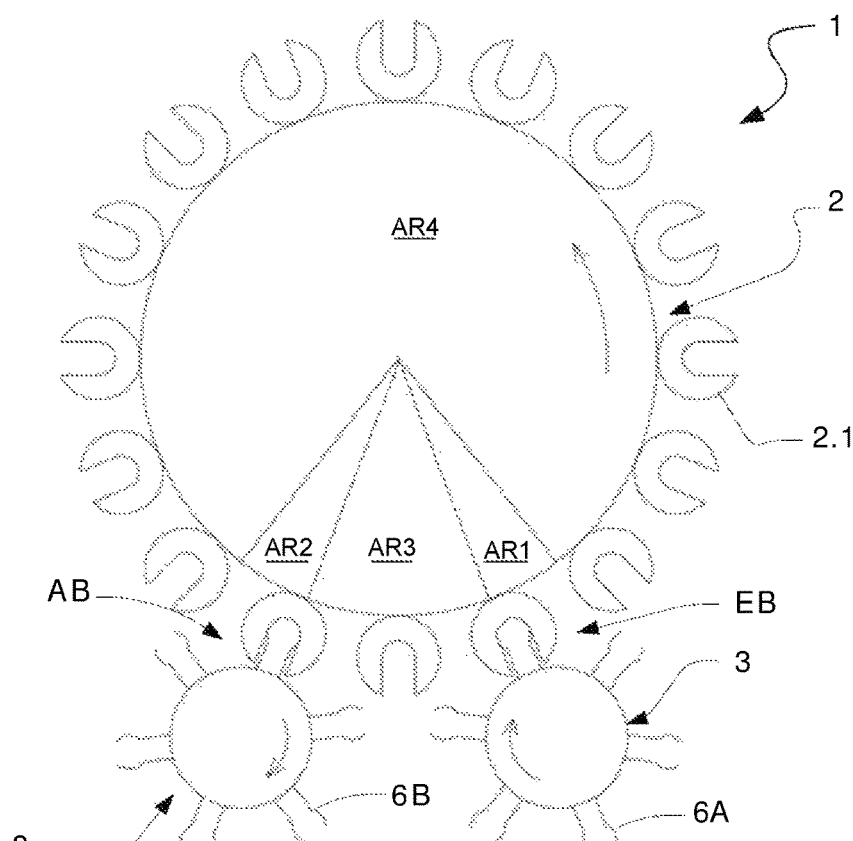
FIG. 1 shows a top view of a container-processing machine having three rotors.

FIG. 1 shows a sectional view of a container handler 1 having a first rotor 2 that rotates about a vertical machine-axis. An example of a first rotor 2 is a transport star.

The first rotor 2 carries receptacles 2.1 around a periphery thereof. Each receptacle 2.1 carries a container B. A receptacle 2.1 can therefore be considered a "container receptacle."

The first rotor 2 has been marked to show several angular ranges in a stationary reference frame. These are the first angular range AR1, the second angular rage AR2, the third angular range AR3, and the fourth angular range AR4. As the first rotor 2 rotates, the receptacles 2.1 pass through each of these angular ranges.

In some embodiments, the container handler 1 is a labeling machine and the first rotor 2 conveys containers to a labeling station. However, this is only an example. Other types of container handler 1 can also be used.

A receptacle 2.1 clamps a container B in the region of its mouth MB. In some embodiments, the receptacle 2.1 suspends the container B so that it hangs freely without being supported under its base. This ensures that the region to be labeled remains accessible.

At an outlet region AB, the second rotor 3 conveys arriving containers to the first rotor 2. The second conveyor 3 features first holders 6A distributed around its periphery. Each first holder 6A fixes an arriving container so that it can be delivered to the first rotor 2.

The first rotor 2, the second rotor 3, and the spaces between the receptacles 2.1 and the first holders 6A are arranged so that the receptacles 2.1 mesh with the first holders 6A when the movement path of the receptacles 2.1 intersects the movement path of the first holders 6A. This permits the second rotor 3 to handover a container B to a receptacle 2.1 on the first rotor 2 while the receptacle 2.1 is within the first angular range AR1. The handover occurs at the outlet region AB, which extends along the intersection of the first rotor 2 and the second rotor 3.

In some of its embodiments, the container handler 1 also features a third rotor 8. The third rotor 8 has second holders 6B distributed on its periphery. In many of these embodiments, the third rotor 8 is a transfer star that transports exiting containers away from the first rotor 2.

The second holders 6B likewise mesh with the receptacles 2.1 as a result of an intersection between the movement paths of the receptacles 2.1 and the second holders 6B. This results in a handover of a container from a receptacle 2.1 on the first rotor 2 to a second holder 6B on the third rotor 8 while the receptacle is within a second angle range AR2 along the first rotor 2. The handover occurs in an inlet region EB at the intersection of the first rotor 2 and the third rotor 8.

In the illustrated embodiment, each of the first and second holders 6A, 6B takes the form of a pair of tongs. The togs reversibly deform upon entry or exit of a container B between them. These tongs passively clamp a container B within an accommodation region between them.

In alternative embodiments, the first and second holders 6A, 6B are grippers. In these embodiments, an actuator opens or closes the grippers so as to release or fix a container.

Figure 2:
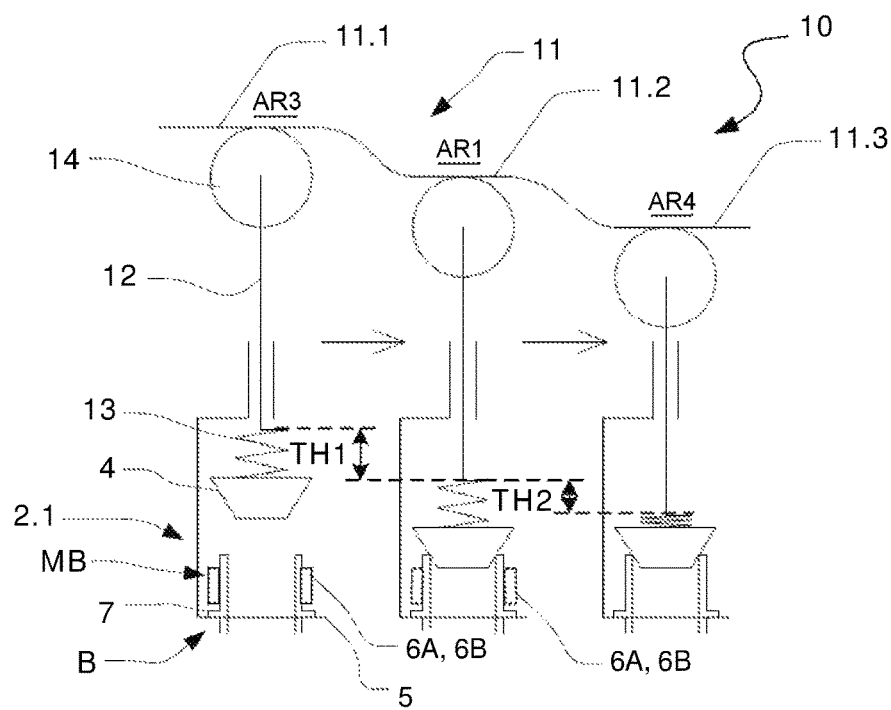
FIG. 2 shows steps carried out during a multi-step clamping procedure carried out by the container-processing machine of FIG. 1 under control of a control curve.

FIG. 2 shows details of a container receptacle 2.1 on the first rotor 2. The container receptacle 2.1 engages a container B at a mouth region MB on the container's upper end.

The container receptacle 2.1 includes a centering element 4 and a counter-bearing 5. The counter-bearing 5 interacts with the centering element 4.

The centering element 4 presses against a container's mouth. A suitable shape for a centering element 4 is one that tapers as it approaches the container's mouth. Examples include a cone, a tulip, and a truncated cone. In either case, part of the centering element 4 enters the container's mouth so as to hold and center the container B.

In some cases, container processing includes applying forces that may be strong enough to deform the container B. Therefore it may be necessary to stabilize the container B so that it can hold its shape. One way to do so is by pressurizing the container's interior. In such cases, the centering element 4 forms a gas-tight seal at the container B. In some of these embodiments, a gas passage for introducing the pressurizing gas passes through the centering element 4.

The counter-bearing 5 interacts with an outer contour 7 of the container B. An example of such an outer contour 7 is a neck ring. The counter-bearing 5 suspends the container B from this outer contour. In some embodiments, the counter-bearing 5 is a fork.

Relative movement of the counter-bearing 5 and the centering element 4 permits the container B to be clamped at its mouth region MB. In some embodiments, relative motion results from a fixed counter-bearing 5 and a movable centering element 4. However, in other embodiments, the converse is true. Relative movement results from a fixed centering element 4 and a movable counter-bearing 5.

Relative movement between the centering element 4 and the counter-bearing 5 results from a movement mechanism 10 that clamps or releases the container B depending on the position of the container receptacle 2.1.

Referring now to FIG. 2, the movement mechanism 10 clamps the container B in multiple steps, each of which corresponds to a partial stroke. Each step applies a different clamping force.

The left-hand portion of FIG. 2 shows the configuration at a first partial-stroke TH1. During the first partial-stroke TH1, the movement mechanism 10 releases the container B from the second holder 6B. This configuration occurs in third angle range AR3 along the first rotor 2, which is shown in FIG. 1.

In the first partial-stroke, the centering element 4 is raised above a container's mouth to permit the container B to be brought into the receptacle 2.1. The counter-bearing 5 suspends the container B. The holder 6 that is delivering the container B encloses at least part of the container's mouth region MB. In the illustrated embodiment, it does so between the container's mouth and the outer contour 7, and hence above the counter-bearing 5.

The middle portion of FIG. 2 shows the movement mechanism 10 after completion of the first partial-stroke TH1. Completion of the first partial-stroke causes the centering element 4 to press on the container's mouth with a first pressure at the first angle range AR1 before any container processing has begun.

The first pressure is selected such that the counter-rotation of the first and second rotors 2, 3 disengages the container B from the first holder 6A but does not disengage it from the receptacle 2.1. As a result, the first partial-stroke TH1 causes a preliminary fixing of the container B so that the container B can be released from the first holder 6A. The dashed line with which the first holder 6A is drawn represents this release.

Once the container B has been released from the first holder 6A and the first holder 6A no longer meshes with the receptacle 2.1, there is no longer a reason to constrain the applied pressure. Accordingly, the movement mechanism 10 completes a second partial-stroke TH2, as show in the right-hand portion of FIG. 2. In this second partial-stroke TH2, causes the centering element 4 increases the first pressure to a second pressure, thereby fully clamping the container B.

With the container B now fully clamped, it is ready for handling. As such, the first rotor 2 moves the container B towards a container inlet so that the container B enters the fourth angular-range AR4. It is within this fourth angular range AR4 that the container undergoes one or more container-handling steps.

The mechanism for carrying out the first and second partial strokes relies on a control curve 11 that vertically adjusts the centering elements 4 as the first rotor 2 rotates.

A mover 14 connects to the control curve 11 and moves up and down with the control curve 11. This causes a plunger 12 whose proximal end connects to the mover 14 to move up and down with the control curve 11.

The distal end of the plunger 12 connects to a proximal end of a spring 13. A distal end of the spring 13 connects to the centering element 4. The spring 13 thus applies a force o the centering element 4. The force, however, is variable as it depends on how much the spring is compressed. The two partial strokes TH1, TH2 are the result of lower compression and a higher compression of this spring 13. This, in turn, results from the shape of the control curve 11.

For example, while the receptacle 2.1 travels through the fourth angular range AR4, the control curve 11 is shaped to compress the spring 13 enough to cause the full clamping force associated with the second partial-stroke TH2. While the receptacle travels through the first and second angular ranges, the control curve 11 causes only a mild compression of the spring corresponding to the first partial-stroke TH1.

FIG. 2 shows first, second, and third curve levels 11.1, 11.2, 11.3 of the control curve 11. A smooth path connects these levels to each other to avoid discontinuities in the mover's travel.

The first curve level 11.1 is used when the receptacle is passing through the third angle range AR3. In this case, the centering element 4 is raised as high as it can be.

The second curve level 11.2 is used when the receptacle is within the first and second angular regions AR1, AR2. This only partially compresses the spring 13 and thus results in only a partial clamping of the container B.

The third curve level 11.3 fully compresses the spring 13 and thus applies a higher clamping force. This third curve level is used when the receptacle is within the fourth angular region AR4.

In some cases, there is a hole in the container flow. As a result, there may be no container present in the receptacle 2.1 while the movement mechanism 10 is carrying out the partial strokes.

Figure 3:
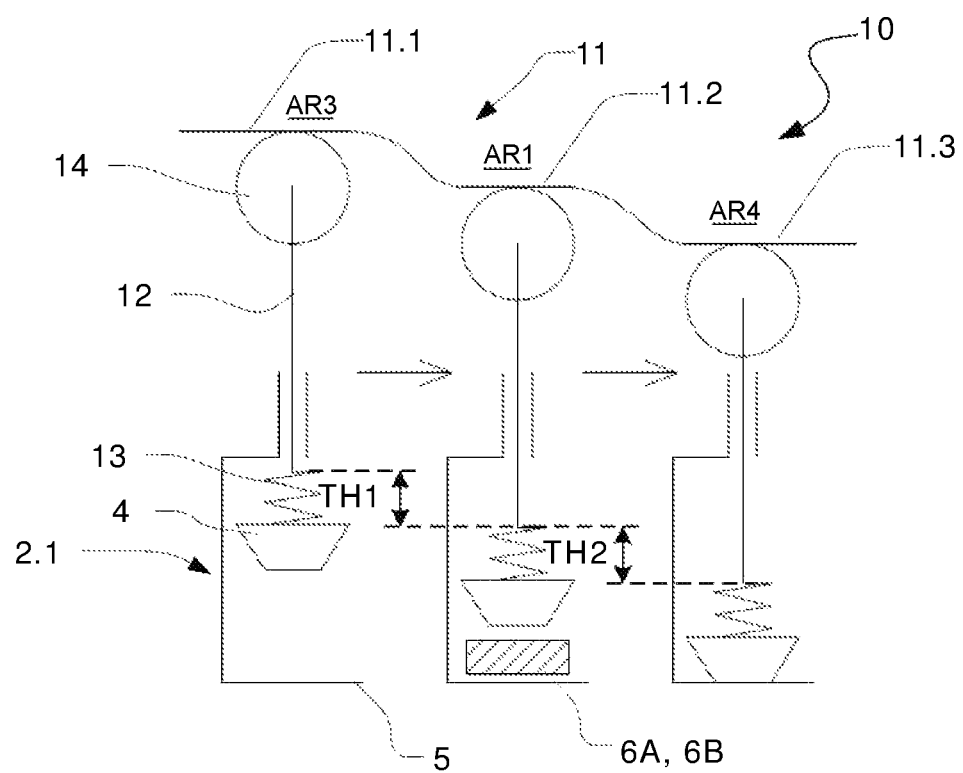
FIG. 3 shows steps similar to those in FIG. 2 but in the case of an empty space in the container flow.

As shown in FIG. 3, the height of the control curve's intermediate level 11.2 is selected such that if no container is present in the receptacle 2.1, the centering element 4 does not move far enough to reach the counter-bearing 5. This means that the centering element 4 does not contact the holder 6. On the other hand, if a container does happen to be present in the receptacle 2.1, the intermediate level's height causes the centering element 4 to bear on the container's mouth with enough pressure to release the holder 6 from the container B.

In some embodiments, the height of the control curve 11 is adjustable. This permits the container-handling device 1 to accommodate different types of container.

In other embodiments, it is possible to modify the control curve 11 on a segment-by-segment basis. For example, the segment that forms the intermediate level 11.2 can be replaced so as to change the height of the intermediate level 11.2 without affecting that of the first and second levels 11.1, 11.3. This permits improvement adjustment to container formats, accommodation of different centering elements, and accommodation of different positions of the first holders 6A and second holders 6B.

In some embodiments, partial clamping occurs in the transition region between the fourth angular range AR4 and the third angular range AR3. This is useful in those cases in which a container receptacle 2.1 happens to not be occupied.

In such cases, it is possible to avoid a collision between the second holders 6B and the centering element 4.

The invention has been described heretofore by way of exemplary embodiments. It is understood that a large number of modifications or derivations are possible, without thereby departing from the inventive concept underlying the invention.

Having described the invention and a preferred embodiment thereof, what is claimed as new and secured by letters patent is:

1. An apparatus comprising a container-handling device, said container-handling device comprising a first rotor, a second rotor, holders that are arranged around a periphery of said second rotor, each of said holders being a container holder that holds a container while said container is being transported by said second rotor, and a receptacle, said receptacle being one of a plurality of container receptacles that are arranged around a periphery of said first rotor such that, as said first rotor rotates, each of said receptacles passes through first, second, third, and fourth angular ranges, wherein said holders and said receptacles interact with each other by meshing while both are within said first angular range, wherein, as a result of said interaction, said container is transferred between said first and second rotors, wherein said receptacle comprises a movement mechanism, a centering element and a counter-bearing that interacts with said centering element, wherein, when a receptacle has a container, relative movement therebetween causes said centering element and said counter-bearing to cooperate in clamping said container between them at a mouth region of said container with said holder engaging said container above a region at which said counter-bearing engages said container, wherein said movement mechanism is configured to cause said relative movement between said centering element and said counter-bearing element, as a result of which said receptacle executes a first partial-stroke and a second partial-stroke, wherein said first partial-stroke occurs while said receptacle is in a first angular region and said second partial-stroke occurs after said receptacle has left said first angular region, wherein, during said first partial-stroke, said centering element is made to bear against a container's mouth with a first pressure, and wherein, during said second partial-stroke, said centering element is made to bear against said mouth a second pressure, said second pressure being in excess of said first pressure.

2. The apparatus of claim 1, wherein, when no container is in said receptacle, said centering element is above said holder and separated from said holder by a distance.

3. The apparatus of claim 1, further comprising a control curve, wherein said control curve controls said movement mechanism.

4. The apparatus of claim 3, wherein said control curve comprises steps between levels, wherein, in a first level, said centering element is spaced at a distance from a mouth of said container, wherein, in a second level, said centering element is pressed against said mouth, and wherein a third level is an intermediate level that is between said first and second levels.

5. The apparatus of claim 4, wherein said intermediate level is disposed at a location that causes said centering element to complete said first partial-stroke.

6. The apparatus of claim 4, wherein said intermediate level controls said movement mechanism only while said container receptacle is in said first angular region.

7. The apparatus of claim 3, wherein said control curve is height adjustable.

8. The apparatus of claim 3, wherein said control curve comprises segments and said segments of said control curve are exchangeable.

9. The apparatus of claim 3, wherein said control curve has different angular ranges and said intermediate level is present at different angular ranges of said control curve.

10. The apparatus of claim 1, wherein said centering element is exchangeable without having to use tools and wherein said centering element is exchangeable at a plunger or at a spring.

11. The apparatus of claim 1, wherein said container comprises a neck ring and wherein said apparatus further comprises a support bearing for supporting said neck ring.

12. The apparatus of claim 1, wherein said centering element comprises a cone.

13. The apparatus of claim 1, wherein said centering element comprises a tulip.

14. The apparatus of claim 1, wherein said centering element comprises a truncated cone.

15. The apparatus of claim 1, wherein said movement mechanism comprises a plunger and wherein said plunger moves said centering element.

16. The apparatus of claim 1, wherein said movement mechanism comprises a spring that is configured to be compressed when said centering element is pressed onto a mouth of said container.

17. The apparatus of claim 1, wherein said holder comprises tongs.

18. The apparatus of claim 1, wherein said holder is configured to fix said container in a region between a container mouth and an outer contour of said container and wherein said counter-bearing supports said outer contour.

19. A method comprising using a container-handling device comprising first and second rotors, holders that are arranged around a periphery of said second rotor, each of said holders being a container holder that holds a container while said container is being transported by said second rotor, and a receptacle, said receptacle being one of a plurality of container receptacles that are arranged around a periphery of said first rotor such that, as said first rotor rotates, each of said receptacles passes through first, second, third, and fourth angular ranges, wherein said receptacle comprises a movement mechanism, a centering element and a counter-bearing that interacts with said centering element, said method comprising causing said holders and said receptacles to interact with each other by meshing while both are within said first angular range thereby transferring said container between said first and second rotors such that said receptacle receives said container, while said receptacle is in said first angular region, executing a first partial stroke that causes said centering element to bear against said container's mouth with a first pressure, and after said receptacle has left said first angular region, executing a second partial stroke that causes said centering element to bear against said container's mouth with a second pressure in excess of said first pressure.

* * * * *